United States Patent

Thauvin et al.

[11] Patent Number: 5,924,045
[45] Date of Patent: Jul. 13, 1999

[54] TELEPHONE COMPRISING AN IDENTIFICATION MODULE

[75] Inventors: Philippe Thauvin, Le Mans; Jean-Michel Evano, Fontenay Aux Roses; Laurent Chivallier, Yvre L'Eveque, all of France

[73] Assignee: U.S. Philips Corporation, New York, N.Y.

[21] Appl. No.: 08/754,665

[22] Filed: Nov. 21, 1996

[30] Foreign Application Priority Data

Nov. 22, 1995 [FR] France .................................. 95 13867

[51] Int. Cl.⁶ ...................................................... H04Q 7/34
[52] U.S. Cl. .......................... 455/558; 455/418; 455/550; 455/565
[58] Field of Search ..................................... 455/558, 550, 455/557, 556, 566, 575, 418, 420, 466, 565

[56] References Cited

U.S. PATENT DOCUMENTS 5,353,328  10/1994  Jokimies ................................ 455/558
5,404,580  4/1995   Simpson et al. ..................... 455/558
5,675,628  10/1997  Hokkanen .............................. 455/433
5,748,720  5/1998   Loder .................................... 379/144

FOREIGN PATENT DOCUMENTS

WO9112698  8/1991  WIPO .

Primary Examiner—Willis R. Wolfe
Assistant Examiner—Hieu T. Vo
Attorney, Agent, or Firm—Dicran Halajian

[57] ABSTRACT

A telephone is disclosed having a dummy removable SIM card which inhibits normal operation of the telephone while allowing turn-on of the telephone for demonstration purposes, as well as for memory back-up and restore purposes. The dummy removable SIM card authorizes operation of the telephone except for the transceiver, thus allowing a potential buyer to inspect the telephone features, such as seeing menus on the display, hearing tones, and cycling through different modes of the telephone. For compliance with telephone standards, such as the GSM standard, the dummy removable SIM card allows emergency calls which are typically free of charge and do not incur network connection charges.

7 Claims, 3 Drawing Sheets

． ，

TELEPHONE COMPRISING AN IDENTIFICATION MODULE

FIELD OF THE INVENTION

The present invention relates to a telephone operating with the aid of a removable identification circuit, the telephone comprising:

a transceiving part for transmitting and receiving transmission signals via a propagation medium for permitting a connection over a telephone network, a control assembly for receiving instructions from the user, a visual display assembly for showing operation indications to the user, a connection circuit for connecting said removable identification circuit, a management assembly for managing the operation of the telephone.

The invention likewise relates to an identification module suitable for such a telephone.

The invention particularly relates to telephones of the mobile radiotelephone type known by the name of GSM telephones operating in networks. These are used by various operators.

The standard governing these networks prescribes that it is always possible to make an emergency call (fire brigade, police, etc.).

BACKGROUND OF THE INVENTION

Patent document PCT no. WO91/12698 describes such a telephone. In this document there is proposed to utilize a removable identification circuit which activates predetermined functions. Among these functions there still remains in the network a function of transmitting information other than emergency calls.

This information transmission function in the network may form an inconvenience for certain applications. Actually, there are applications for which no transmission whatsoever is desired in the network, except for emergency calls. A first application relates to the case of, for example, the seller of telephone terminals who has to inform his clients of the possibilities of the products. Making the subscriber authentication and localisation mechanisms operative on such an occasion would needlessly form a load on the network. Moreover, it is difficult to reserve at each vending point one or various real subscriber cards only for the need of the demonstrations. A second application is the backing up of the environment of the mobile telephone and its resetting. This may be experienced when the telephone is to go into repair and the environment programmed by the user runs the risk of getting lost.

The present invention proposes a mobile radiotelephone of the type defined in the opening paragraph, which allows of performing above-described operations without a connection being established close to the operators.

SUMMARY OF THE INVENTION

Therefore, such a telephone is characterized in that there is provided a removable identification circuit which comprises a marker for defining a function called demonstration function. Thus, due to the measure proposed by the invention, it becomes possible that the management assembly comprises detecting means for detecting this marker for:

authorizing the operation of the control assembly, authorizing the operation of the visual display assembly, inhibiting the operation of the transceiving part for a normal connection to the network.

These and other aspects of the invention will be apparent from and elucidated with reference to the embodiments described hereinafter.

DESCRIPTION OF PREFERRED EMBODIMENTS

Figure 1:
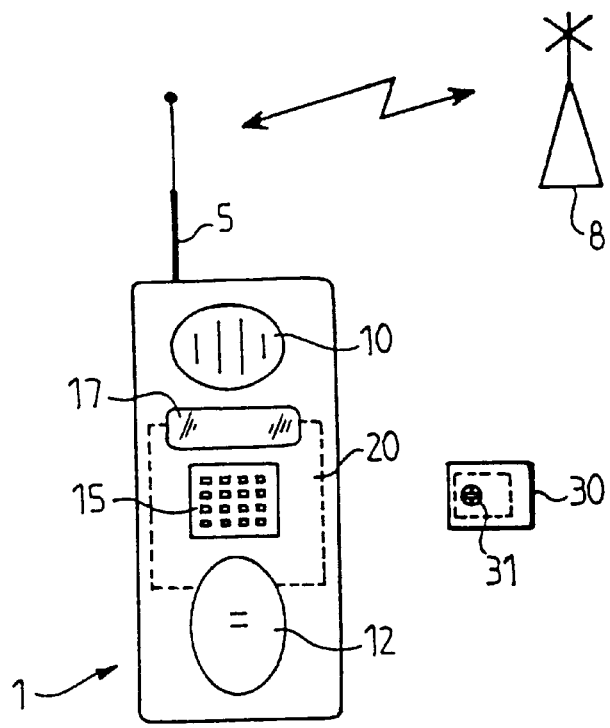
FIG. 1 shows a mobile radiotelephone according to the invention.

In FIG. 1 reference I indicates a mobile radiotelephone according to the invention. This telephone has an antenna 5 which makes it possible for the telephone to transmit and receive waves to and from a connecting station 8 for connection to a radio network of the GSM type. The telephone 1 comprises an ear piece 10, a microphone 12, a keypad 15 and a visual display 17. The dashed lines represent an electronic part 20 located inside the telephone. According to the GSM standards (I-ETS 300 045-1 or pr ETS 30), there is provided a removable identification circuit which occurs in the form of a SIM card of the ISO format or of the so-called plug-in format, which is referenced 30 in FIG. 1. This card has electrical contacts 31 which ensure the interface with a connector 35 which forms part of the mobile radiotelephone 1. This connector is shown in FIG. 2.

Figure 2:
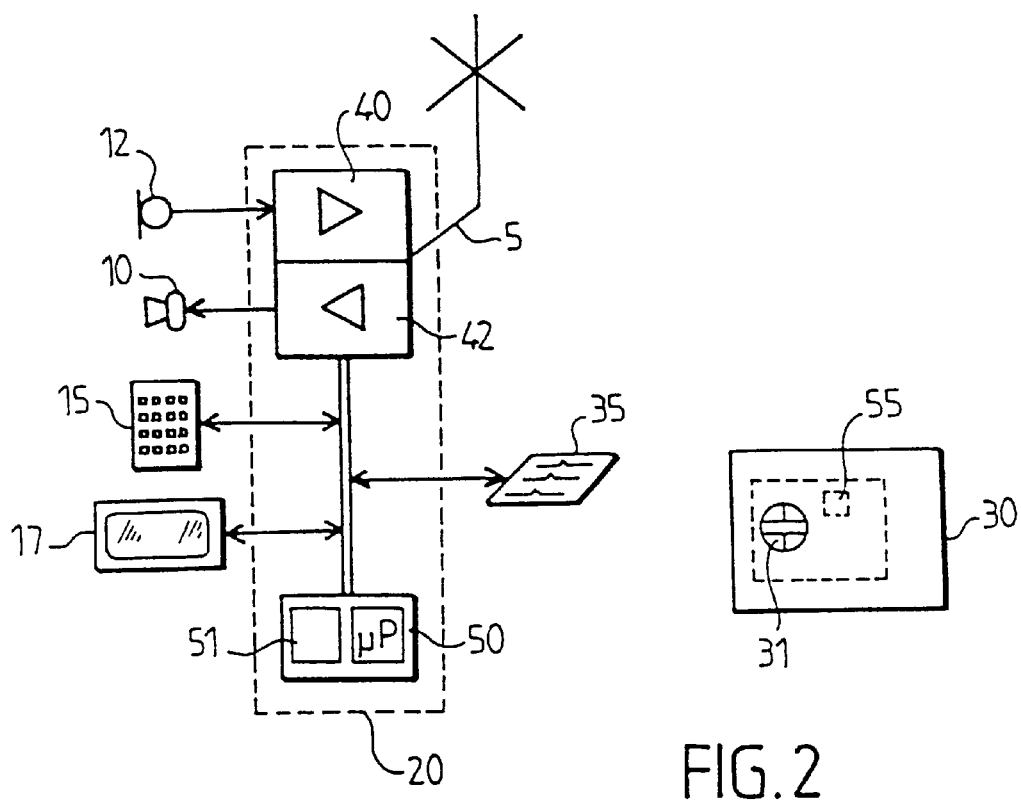
FIG. 2 shows a block diagram of the telephone shown in FIG. 1.

In this FIG. 2, the elements it has in common with those of FIG. 1 carry like references. The structure of the electronic part 20 is shown here in detail.

This part 20 comprises a transmission assembly 40 and a receiving assembly 42 for transmitting and receiving various information signals which are usual in GSM technology, more particularly those coming from the microphone 12 and those relating to the ear piece 10. A microprocessor assembly 50 ensures the management of the following elements: the transmitting and receiving parts 40 and 42, a control assembly for receiving user-originated instructions, formed by a keypad 15 and a visual display assembly for showing operation indications to the user, formed by a visual display 17, and also manages the exchange of information with the SIM module 30 via the connectors 35 and 31. This assembly 50 particularly comprises a memory 51 of the EPROM type, preferably intended to contain a subscriber configuration file and also a list of abbreviated dial telephone numbers.

It will be recollected that the SIM module or card 30 comprises a set of files that can be stored in a memory 55 (with reference to the standard cited above). The assembly 50 is capable of accessing these files.

According to the invention, one of these files is reserved for writing therein a significant word for distinguishing its mode of operation from the other modules provided by the operators. Thus, for example, the word "DMO" is written in the file $EF_{AD}$ defined by said standard. This forms a first measure of the invention where a SIM module with the word "DMO" in its memory is used for demonstration purposes. This DMO SIM module disables the transceiver 40, 42 to prevent normal connection to a network, and enables the control assembly 15 and display 17. Another measure of the invention consists of providing instructions for the microprocessor assembly 50.

Figure 3:
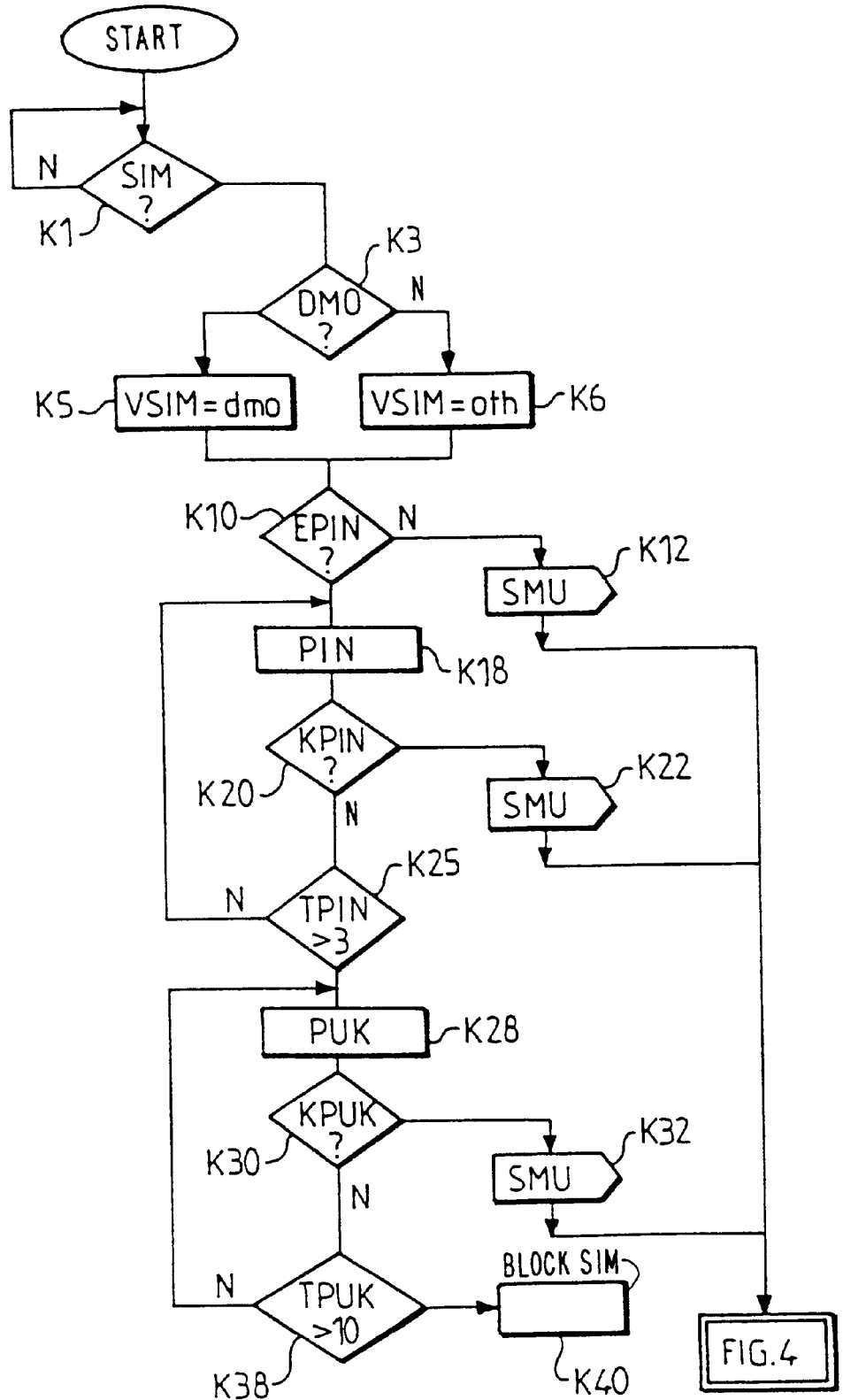
FIG. 3 is a first block diagram intended for explaining the telephone according to the invention.

This is shown by a flowchart in FIG. 3. The first operating step is indicated in box K1. This box shows the detection of the presence of a SIM module via the connector. As long as a module is not inserted into the telephone 1, this phase of operation indicated in box K1 is maintained. The moment a module is inserted, box K3 is proceeded to, where the presence of the word DMO is examined. If this word is present, an indicator VSIM is assigned the word "dmo" in box K5. If this word is not present, the indicator contains the word "oth", which is shown in box K6. Box K10 is proceeded to, which verifies the necessity of entering a personal identification code (PIN). If this entering is not necessary, a procedure SMU is performed in box K12, which checks the SIM module. If a personal identification code is to be entered, box K18 is proceeded to. Then, when the code has been entered, the SIM module verifies whether it is correct in box K20. If the code is correct, box K22 is proceeded to, which calls in said procedure SMU. If the code is incorrect, another attempt is made. In box K25 there is verified whether this number of attempts exceeds 3, for example. This number of attempts is managed inside the module 30. If this number of attempts is not reached, box K18 is returned to. If it is reached, box K28 is reached to capture a code PUK which is a PIN deblocking code and has eight characters. The SIM module verifies this code in block K30. If this code is correct, box K32 is proceeded to in which said procedure SMU is called in. If this code is not correct, this code is again tried to be seized. In box K38 there is verified whether the number of attempts does not exceed 10. If it does not, box K28 is returned to. If it does, the SIM module is blocked and does not allow the telephone to be initialised.

Figure 4:
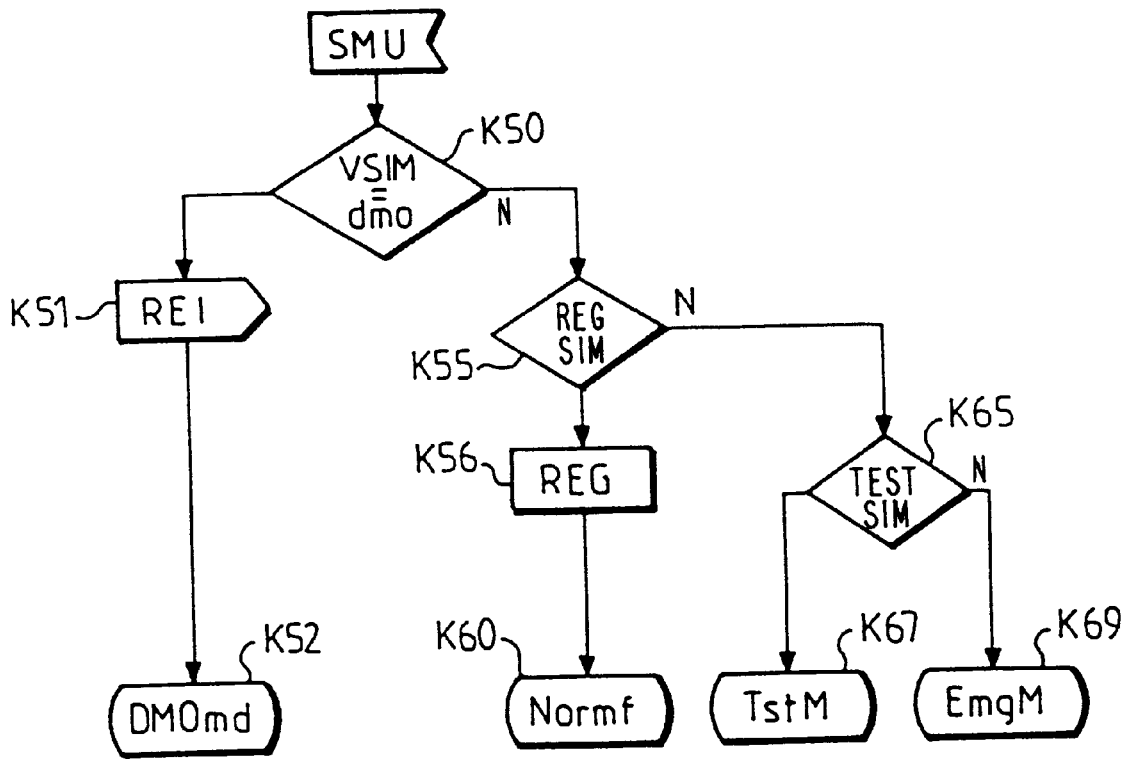
FIG. 4 is a second block diagram intended for explaining the telephone according to the invention.

The means according to the invention will appear in the flowchart of FIG. 4 which explains the procedure SMU which has been discussed.

This procedure starts with the verification of the indicator VSIM (box K50). If this indicator contains the word "dmo", a procedure REI is executed in box K51, which allows the telephone to admit emergency calls before proceeding to the processing of DMOmd (box K52). If the indicator VSIM does not contain the word "dmo", box K55 is proceeded to, which starts a normal operation of the telephone. There is verified whether it is a normal type of module. If it is, in box K56 a procedure REG is executed before the normal operating mode Normf (box K60) is proceeded to, which is to say, the procedure of connecting to the network to which the user has a subscription. If it is not a normal type of module, one proceeds from box K55 to box K65 where the possibility is verified that this module is a test module (used by the companies entitled to provide amusement). If it is a test module, these tests are carried out in a procedure TstM (box K67). If this is not a test module, a procedure EmgM, which is a procedure permitting solely of the management of emergency calls, is carried out in box K69.

Figure 5:
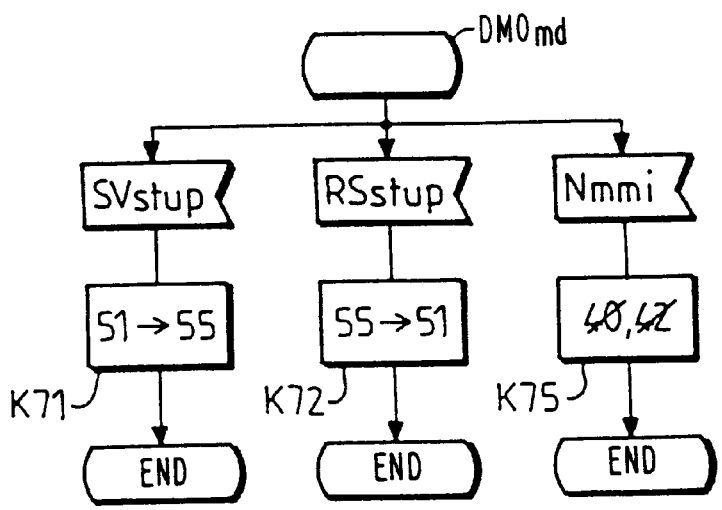
FIG. 5 is a third block diagram intended for explaining the telephone according to the invention.

The flowchart of FIG. 5 shows the possibilities which the procedure DMOmd provides.

A first possibility consists of backing up in the module of the configuration of the telephone from the files of the assembly 50 stored in the memory 51 to a backup file of the module 30 stored in the memory 55. This is shown in box K71.

A second possibility consists of performing the reverse operation, that is to say, of transferring the files of the module to the configuration file of the telephone, thus from the memory 55 to the memory 51 (box K72).

A third possibility consists of obtaining all the functions of the station: notably the configuration of the display, worded differently, prohibiting the operation of the parts 40 and 42 (see box K75). These various possibilities are triggered when there is detected that two keys are touched simultaneously, or a sequence of keys on the keypad of the control circuit 15 is touched according to the methods well-known from programming.

We claim:

1. A telephone comprising:

a transceiver which transmits and receives signals;

a management assembly having a first memory, said management assembly managing operations of the telephone; and a removable identification module having a second memory which stores a demonstration marker, said demonstration marker allowing access to a demonstration procedure and inhibiting operation of said transceiver.

2. The telephone of claim 1, wherein said demonstration procedure backs up contents of said first memory to said removable identification module.

3. The telephone of claim 1, wherein said demonstration procedure writes contents of said first memory to said second memory.

4. The telephone of claim 1, wherein said demonstration procedure restores contents of said first memory from said removable identification module.

5. The telephone of claim 1, wherein said demonstration procedure writes contents of said second memory to said first memory.

6. A telephone comprising:

a transceiver which transmits and receives signals;

a management assembly which manages operations of the telephone; and a removable identification module which allows turning on of said telephone while inhibiting connection of said telephone to a network.

7. A telephone comprising:

a transceiver which transmits and receives signals;

a key pad which receives inputs from a user;

a display which displays information to the user; and a removable identification module which enables said key pad and said display and disables said transceiver.

* * * * *